US 7,845,317 B2

(12) United States Patent
Max et al.

(10) Patent No.: US 7,845,317 B2
(45) Date of Patent: Dec. 7, 2010

(54) ENERGY CONVERTER

(75) Inventors: Erland Max, Västra Frölunda (SE); Staffan Lundgren, Hindås (SE); Joop Somhurst, Göteborg (SE); Anders Höglund, Fjärås (SE); Göran Wirmark, Göteborg (SE); Lars Gertmar, Västerås (SE); Ingemar Denbratt, Kullavik (SE)

(73) Assignee: Volvo Car Corporation, Gothenburg (SE)

( * ) Notice: Subject to any disclaimer, the term of this patent is extended or adjusted under 35 U.S.C. 154(b) by 1343 days.

(21) Appl. No.: 10/907,026

(22) Filed: Mar. 16, 2005

(65) Prior Publication Data

US 2008/0036312 A1 Feb. 14, 2008

Related U.S. Application Data

(63) Continuation of application No. PCT/SE03/01441, filed on Sep. 15, 2003, now abandoned.

(30) Foreign Application Priority Data

Sep. 16, 2002 (SE) ..................................... 0202758

(51) Int. Cl.
*F02B 71/00* (2006.01)

(52) U.S. Cl. .................................. 123/46 E; 123/41.66

(58) Field of Classification Search .................. 290/1 R, 290/40 A, 40 B, 40 C; 123/41.66, 46 E; 310/40 R, 310/152, 12, 14, 15; 322/25, 29, 3; 180/65.245, 180/65.8, 65.23, 65.265, 65.31, 65.27, 65.25, 180/65.28; 307/12; 340/464, 3.43; 903/946; 60/602, 641.2; 701/101–105, 36, 54
See application file for complete search history.

(56) References Cited

U.S. PATENT DOCUMENTS 1,903,361 A * 4/1933 Post ............................. 271/270

(Continued)

FOREIGN PATENT DOCUMENTS

DE 3727335 A1 2/1988

(Continued)

OTHER PUBLICATIONS

Aichlmayr, Hans; Design Considerations, Modeling, and Analysis of Micro-Homogeneous Charge Compression Ignition Combustion Free-Piston Engine, Dec. 2002, University of Minnesota, pp. 22-52.*

*Primary Examiner*—Michael Cuff
*Assistant Examiner*—Keith Coleman
(74) *Attorney, Agent, or Firm*—Novak Druce + Quigg, LLP

(57) ABSTRACT

Method and arrangement for providing an energy converter that includes a combustion system (1) including at least one piston (2, 3), at least one combustion chamber (6, 7) having at least one inlet (11, 13) and at least one outlet (10, 12) with inlet and outlet valves (14, 15, 16, 17). At least one controllable inlet valve and at least one outlet valve is also provided. A fuel supply is provided (18, 19) for supplying fuel and a medium containing oxygen is provided for induction into the combustion chamber (6, 7). An electric machine (9) is arranged to interact directly or indirectly with the piston (2, 3) in an electromagnetic manner such that it produces electrical energy from the piston movements, as well as uses electrical energy to affect the piston movement. A control unit (30) controls the combustion system (1) and the electric machine (9).

The energy converter is arranged to adapt its power output depending on the required load of the energy converter. The invention also relates to a method for starting an energy converter.

24 Claims, 12 Drawing Sheets

U.S. PATENT DOCUMENTS

| | | | | |
|---|---|---|---|---|
| 1,903,381 A | * | 4/1933 | Kennedy | 123/298 |
| 3,612,892 A | * | 10/1971 | Nobile et al. | 290/40 R |
| 3,612,895 A | * | 10/1971 | Niedra | 307/419 |
| 3,805,083 A | * | 4/1974 | Demetrescu | 290/1 R |
| 3,986,796 A | | 10/1976 | Moiroux et al. | |
| 4,532,431 A | * | 7/1985 | Iliev et al. | 290/4 R |
| 5,788,003 A | * | 8/1998 | Spiers | 180/65.245 |
| 6,181,110 B1 | * | 1/2001 | Lampis | 322/3 |
| 6,199,519 B1 | | 3/2001 | Van Blarigan | |
| 6,625,575 B2 | * | 9/2003 | Chihara | 704/260 |
| 6,825,575 B1 | * | 11/2004 | Edelson | 290/40 C |
| 7,307,355 B2 | * | 12/2007 | Uemura | 290/41 |

FOREIGN PATENT DOCUMENTS

| | | |
|---|---|---|
| DE | 3843207 A1 | 6/1990 |
| DE | 19943993 A1 | 3/2001 |
| JP | 10-501039 T2 | 1/1998 |
| JP | 2000-045804 A2 | 2/2000 |
| JP | 2002-511130 T2 | 4/2002 |
| JP | 2001-241302 A2 | 9/2009 |
| WO | WO 00/55482 A1 | 9/2000 |

* cited by examiner

Type: Running 12 kW
Power:          11.56 [kW]
Cycle_energy:   182.8 [J]
Frequency:      63.2 [Hz]
Efficiency:     48.6 [%]
Indicated_effic.: 52.8 [%]
Fuel amount:    57.0 [%]
El-force:       -2663.0 [N]

| | | | |
|---|---|---|---|
| p_atm: | 1.0 [bar] | compression: | 14.5 [-] |
| T_atm: | 63.0 [C] | valve_intake: | 10.0 [% of stroke] |
| p_0: | 1.0 [bar] | valve_exhaust: | 10.0 [% of stroke] |
| T_0: | 63.0 [C] | El_efficiency: | 92.2 [%] |
| p_ign: | 38.8 [bar] | Moving mass: | 4.0 [kg] |
| T_ign: | 627.0 [C] | Diameter: | 80.0 [mm] |
| p_max: | 55.3 [bar] | Maximal stroke: | 50.0 [mm] |
| T_max: | 1399.0 [C] | Actual stroke: | 43.8 [mm] | t_comb:    1.0 [ms]
heat_loss: 0.00025 [W / K*Pa*m2*s]
friction:  60.0 [N]

Type: Single stroke, method 1
Cycle_energy: 18.4 [J]
Cycle_time: 30.1 [ms]
Efficiency: 24.6 [%]
Indicated_effic.: 40.9 [%]
Fuel amount_start: 30.0 [%]
El-force_start: 1380.0 [N]
El-force: -2663.0 [N]

| | | | |
|---|---|---|---|
| p_atm: | 1.0 [bar] | compression: | 14.5 [-] |
| T_atm: | 63.0 [C] | valve_intake_start: | 60.0 [% of stroke] |
| p_0: | 1.0 [bar] | valve_exhaust: | 10.0 [% of stroke] |
| T_0: | 63.0 [C] | El_efficiency: | 92.2 [%] |
| p_ign: | 38.8 [bar] | Moving mass: | 4.0 [kg] |
| T_ign: | 627.0 [C] | Diameter: | 80.0 [mm] |
| p_max: | 38.7 [bar] | Maximal stroke: | 50.0 [mm] |
| T_max: | 851.0 [C] | Actual stroke: | 43.8 [mm] | t_comb: 1.0 [ms]
heat_loss: 0.00025 [W / K*Pa*m2*s]
friction: 60.0 [N]

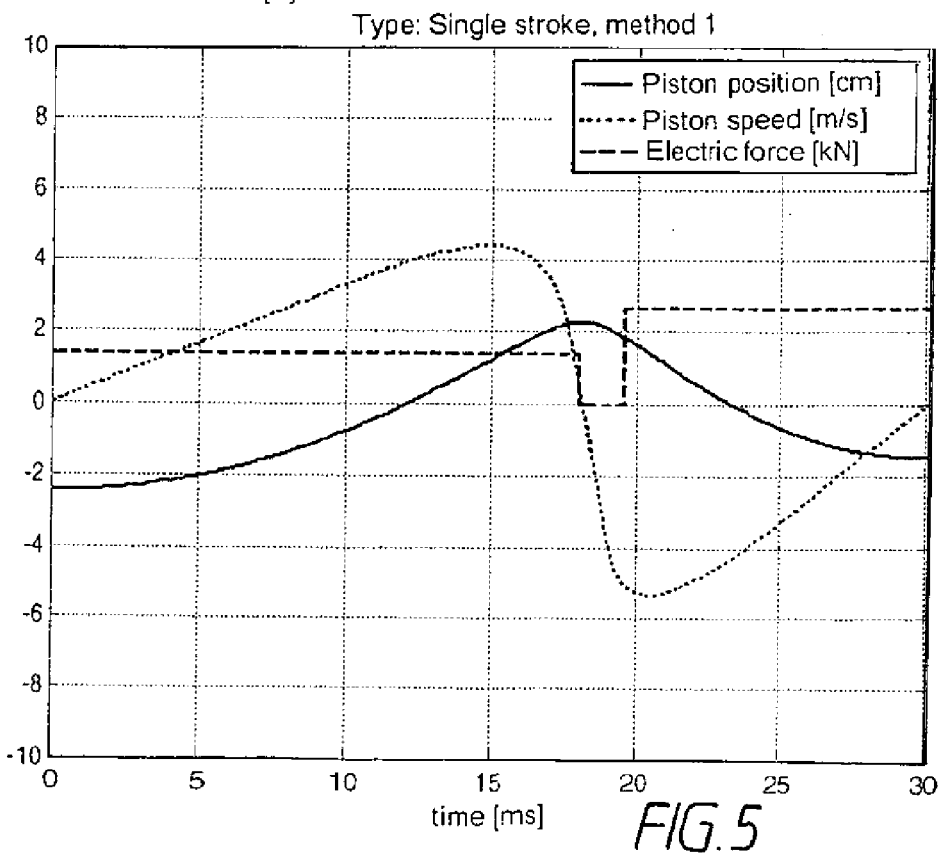

FIG. 5

Type: Single stroke, method 2
Cycle_energy:      73.8 [J]
Cycle_time:        36.4 [ms]
Efficiency:        39.3 [%]
Indicated_effic.:  50.2 [%]
Fuel amount_start: 57.0 [%]
El-force_start:    1850.0 [N]
El-force:          -2400.0 [N]

| | | | |
|---|---|---|---|
| p_atm:  | 1.0 [bar]  | compression:      | 14.5 [-] |
| T_atm:  | 63.0 [C]   | valve_intake_start | 10.0 [% of stroke] |
| p_0:    | 1.0 [bar]  | valve_exhaust:    | 10.0 [% of stroke] |
| T_0:    | 63.0 [C]   | El_efficiency:    | 92.2 [%] |
| p_ign:  | 38.8 [bar] | Moving mass:      | 4.0 [kg] |
| T_ign:  | 627.0 [C]  | Diameter:         | 80.0 [mm] |
| p_max:  | 55.3 [bar] | Maximal stroke:   | 50.0 [mm] |
| T_max:  | 1394.0 [C] | Actual stroke:    | 43.8 [mm] | t_comb:    1.0 [ms]
heat_loss: 0.00025 [W / K*Pa*m2*s]
friction:  60.0 [N]

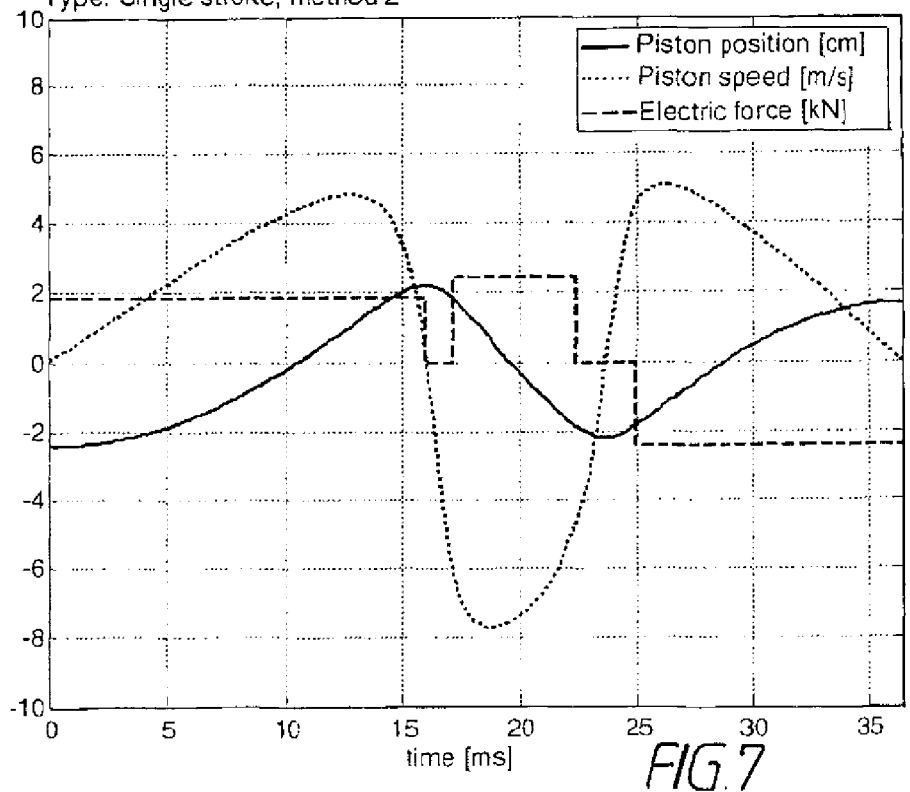

FIG.7

Type: Single stroke, method 2. Cold start -30°C
Cycle_energy: 61.8 [J]
Cycle_time: 32.9 [ms]
Efficiency: 30.7 [%]
Indicated_effic.: 43.1 [%]
Fuel amount_start: 57.0 [%]
El-force_start: 2500.0 [N]
El-force: -2500.0 [N]

| | | | |
|---|---|---|---|
| p_atm: | 1.0 [bar] | compression: | 33.9 [-] |
| T_atm: | -30.0 [C] | valve_intake_start: | 59.0 [% of stroke] |
| p_0: | 1.0 [bar] | valve_exhaust: | 10.0 [% of stroke] |
| T_0: | -30.0 [C] | El_efficiency: | 92.2 [%] |
| p_ign: | 125.7 [bar] | Moving mass: | 4.0 [kg] |
| T_ign: | 627.0 [C] | Diameter: | 80.0 [mm] |
| p_max: | 146.2 [bar] | Maximal stroke: | 50.0 [mm] |
| T_max: | 834.3 [C] | Actual stroke: | 47.3 [mm] | t_comb: 1.0 [ms]
heat_loss: 0.00025 [W / K*Pa*m2*s]
friction: 60.0 [N]

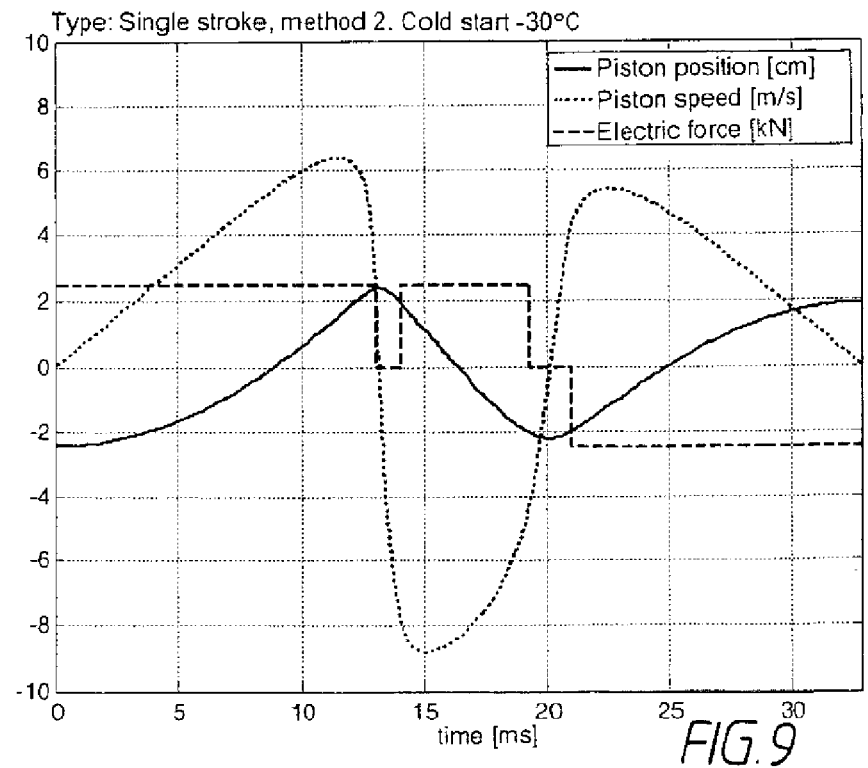

FIG. 9

Type: Running. 39 kW. High power with supercharging.
Power:            39.13 [kW]
Cycle_energy:     427.9 [J]
Frequency:        91.4 [Hz]
Efficiency:       52.0 [%]
Indicated_effic.: 56.4 [%]
Fuel amount:      60.0 [%]
El-force:         -5897.0 [N]

| | | | |
|---|---|---|---|
| p_atm: | 1.0 [bar] | compression: | 14.2 [-] |
| T_atm: | 50.0 [C] | valve_intake: | 10.0 [% of stroke] |
| p_0: | 2.0 [bar] | valve_exhaust: | 10.0 [% of stroke] |
| T_0: | 50.0 [C] | El_efficiency: | 92.2 [%] |
| p_ign: | 75.8 [bar] | Moving mass: | 4.0 [kg] |
| T_ign: | 587.0 [C] | Diameter: | 80.0 [mm] |
| p_max: | 134.4 [bar] | Maximal stroke: | 50.0 [mm] |
| T_max: | 1527.5 [C] | Actual stroke: | 43.7 [mm] | t_comb:    0.5 [ms]
heat_loss: 0.00025 [W / K*Pa*m2*s]
friction:  60.0 [N]

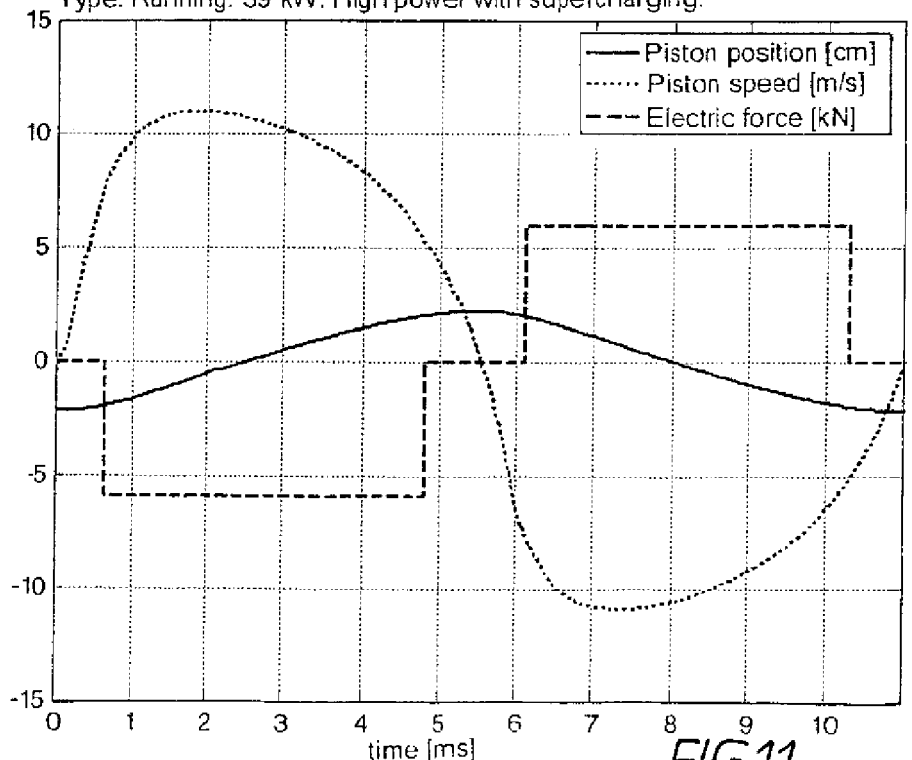

FIG.11

ENERGY CONVERTER

CROSS-REFERENCE TO RELATED APPLICATIONS

The present application is a continuation patent application of International Application No. PCT/SE2003/001441 filed 15 Sep. 2003 which was published in English pursuant to Article 21(2) of the Patent Cooperation Treaty, and which claims priority to Swedish Application No. 0202758-9 filed 16 Sep. 2002. Said applications are expressly incorporated herein by reference in their entireties.

TECHNICAL FIELD

The present invention relates to an energy converter for a free piston engine having a fuel supply means and a medium containing oxygen for a combustion chamber of the engine. An electric machine is also included and which is arranged to interact with a piston of the engine in an electromagnetic manner so as to produce electrical energy from piston movements, as well as use electrical energy to affect the piston movements. A control unit (30) is also included that controls the engine and the electric machine. The invention also includes a method of starting an energy converter in such a system.

BACKGROUND OF THE INVENTION

As one of skill in the art knows, a free piston engine (FPE) is characterized in that it does not have a mechanical linkage (for example, a crankshaft) by means of which reciprocating motion of the piston or pistons is directly converted to motion of another mechanical element or elements. (Free piston engines can be of a single piston or dual piston layout.) In a dual piston layout, there are separate combustion chambers and fuel injection for each piston. The pistons are attached to each other by a rod so that they move simultaneously. A common way of attaining energy from a FPE is to mount an electrical generator to the interconnecting rod.

Another known engine is of the so called HCCI type combustion. When a homogeneous, diluted (air or residual gas fraction) fuel/air mixture is compressed in an engine at such a high temperature that it auto-ignites, the engine is said to operate on homogeneous charge compression ignition (HCCI).

U.S. Pat. No. 6,199,519, for example, discloses a two-stroke, free piston engine with a linear electrical alternator/generator. The engine is driven in an oscillating mode with constant frequency. Fuel and air are introduced in a two-stroke cycle fashion without using valves. The engine operates in an HCCI (autoignition) mode and will shut off when not needed and run at essentially constant velocity and power when on. Regulation of the coil current can be used to regulate the piston velocity as to change the compression ratio if the fuel composition is changed.

The engine/generator is particularly intended for charging batteries in hybrid automobile applications.

To start the engine, the batteries are used to operate the linear alternator as a linear motor. The piston is oscillated in the cylinder, building to a higher compression each cycle until sufficient compression is developed for autoignition and at which time fuel is introduced to the engine and self powered operation will ensue.

WO 01/45977 describes a device including a free piston engine, an electromagnetic energy transducer, a combustion system and a control unit. The combustion system can include one or two active combustion chambers and operates in two strokes, and alternatively four strokes. The device makes it possible to determine the instantaneous position of the piston. By controlling the electrical power to and from the electromagnetic energy transducer, and in combination with spark plugs that are also controlled by the control unit, it is claimed to be possible to displace the piston to a desired position when a combustion is to be initiated by the spark plugs. It is also proposed to control and vary the compression depending on the instantaneous load on the combustion engine (e.g., by increasing the compression to obtain a higher power output). HCCI is mentioned as a possible combustion principle, but there is nothing disclosed on how such a combustion could be controlled. Further, different storing devices for storing at least a part of the combustion energy such as capacitors, batteries and flywheels are discussed. Their use is, however, scarcely described.

Although the existing free piston engine energy converters do convert chemical energy to electric energy in a fairly good way via combustion, they are driven in a constant load situation and therefore these solutions require large energy storage facilities such as battery packs. This type of equipment is expensive and therefore lowers the efficiency of the system.

SUMMARY OF THE INVENTION

One object of the invention is to provide an energy converter that does not need large energy storage. In this regard, the invention is characterized by the fact that the energy converter is arranged to adapt its power output depending on the required load of the energy converter. By doing so, only small energy storage is needed. This reduces both the cost and the weight of the energy converter compared to previous solutions. Further, the invention can be operated very efficiently with very low fuel consumption and very low emissions.

Another object of the invention is to provide a method for operating an energy converter in an efficient way. This object is accomplished by a method in which power output from the energy converter is adapted to the required load of the energy converter.

Another object of the invention is to provide a method for starting an energy converter in an advantageous way. This object is accomplished by a method that includes storing, in capacitor(s), electrical energy and thereby allowing the energy converter to be started within one stroke of the piston.

BRIEF DESCRIPTION OF THE DRAWINGS

Below, the invention is described in greater detail with reference to the accompanying figures of the drawings, and in which:

FIG. 5 shows simulation results from a first example of one-cycle operation of a preferred embodiment of the invention;

FIG. 7 shows simulation results from a second example of one-cycle operation of a preferred embodiment of the invention;

FIG. 9 shows simulation results from a cold start operation of a preferred embodiment of the invention;

FIG. 11 shows simulation results corresponding to operation at a high load of an energy converter according to the invention.

DESCRIPTION OF PREFERRED EMBODIMENT(S)

Figure 1:
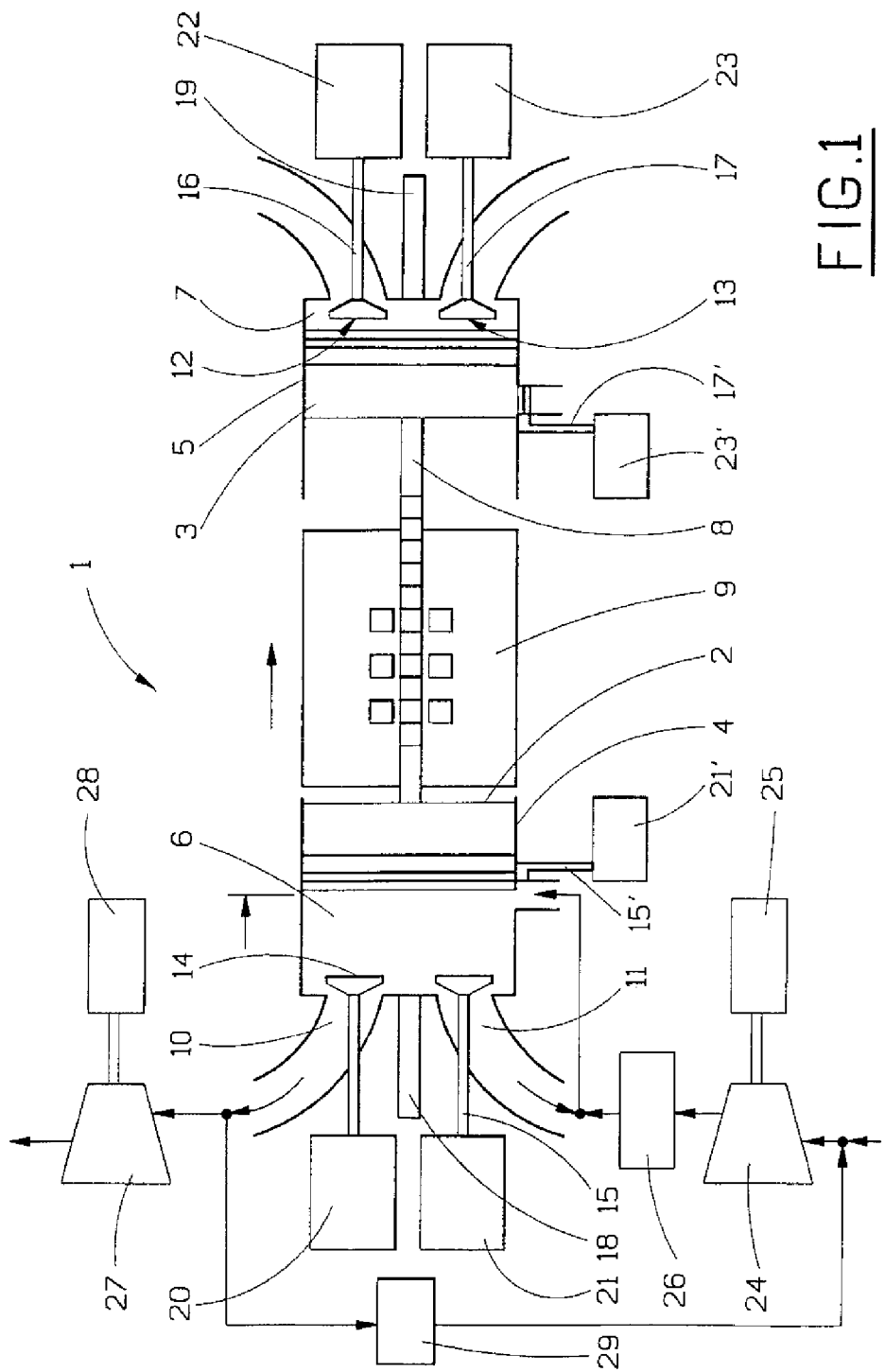
FIG. 1 is a schematic view of an energy converter configured according to a preferred embodiment of the invention.

HCCI combustion: When a homogeneous, diluted (air or residual gas fraction) fuel/air mixture is compressed in an engine at such a high temperature that it auto-ignites, the engine is said to operate on homogeneous charge compression ignition.

Ignition points are provided by multiple exothermal centers (ETC) in the gas mixture. Since HCCI has no flame-propagation, the combustion is instead kinetically controlled. To generate multiple ETCs, it is important to be able to control the homogeneity of temperature and composition in the gas-mixture. The lack of flame-propagation causes the temperature distribution in the combustion chamber after combustion, in contrast to normal flame propagation, to be almost homogeneous. This leads to a reduction of NOx emissions from thousands of ppm to an order of ten ppm.

In the present context, kinetically controlled combustion means that the heat release can be extremely rapid which makes it theoretically possible to approach the ideal Otto-cycle (constant volume combustion). Only very lean or diluted fuel/air mixtures can be combusted this way, provided the compression temperature is high enough. The difficulty with HCCI is controlling the ignition delay in such a way that the combustion phasing is correct under varying speed and load conditions. Since HCCI combustion requires a high dilution of the air/fuel mixture, only the part load portion of the engine operational range can be valid for HCCI combustion (assuming a naturally aspirated engine). If high compression ratios are allowed, the HCCI combustion has the potential to exceed the diesel engine in efficiency (40-45%) without the high NOx and particle emissions. Homogeneous charge compression ignition is not a new idea: as early as the 1940s, a kerosene driven auxiliary engine for a bicycle (Lohmann) was operated with this type of compression ignition and variable compression rate ($r_{c,eff}$=8.5-12.5). During the 1950s, Alperstein, in the 1970s ATAC, and in the 1980s Smokey Yunick and Southwest Research Institute also operated an HCCI engine. The HCCI operation requires either a lean mixture (equivalence ratio, $\Phi$, below 0.5) or high amounts of residual gases (above 40%) to control combustion velocity.

When a fuel having a high octane number is used, high compression temperatures are also required. For these reasons, only 2-stroke engines with high internal EGR on the order as Honda or engines with variable compression ratio like Lohmann have reached production. All attempts with conventional four-stroke homogeneous charge engines have failed due to the difficulty in controlling the auto-ignition process within the potential HCCI speed/load range and during transient engine operation. In the 1990s, the interest in HCCI combustion reawakened again. Today, due to advances made in engine control and variable engine systems, the chances of success are much greater.

One way of realizing a 4-stroke HCCI engine is to emulate the in-cylinder conditions of a 2-stroke engine by trapping large amounts of residual gases. This can be done by closing the exhaust valve early, as described by Kerkau et al., Denbratt and Willand et al. Another alternative is to manipulate the compression temperature by variable intake valve timing such as does Smith et al. and Aceves et al., or by a combination of variable compression and variable intake valve timing as intimated in Denbratt.

An energy converter according to a preferred embodiment of the invention is shown in FIG. 1. The energy converter comprises (includes, but is not necessarily limited to) a free piston combustion system 1 that comprises two pistons 2, 3 with separate cylinders 4, 5 and combustion chambers 6, 7. More precisely, the combustion system 1 comprises a first piston 2 arranged in a first cylinder 4 having a first combustion chamber 6 and also comprises a second piston 3 arranged in a second cylinder 5 and having a second combustion chamber 7.

The pistons are interconnected with a connecting rod 8. A linear electric machine 9 is positioned between the cylinders 4, 5. The rod 8 and the electric machine 9 can interact electromagnetically with each other and the electric machine 9 can operate both as a generator and a motor. Each combustion chamber 6, 7 comprises ports 10, 11, 12, 13 with controllable inlet and outlet valves 14, 15, 15', 16, 17, 17' and a fuel injector 18, 19. More precisely, the first combustion chamber 6 is provided with a first outlet port 10 in which an outlet valve 14 is arranged and a first inlet port 11 in which an inlet valve 15 is arranged. Furthermore, the second combustion chamber 7 is provided with a second outlet port 12 in which a further outlet valve 16 is arranged, and a second inlet port 13 in which a further inlet valve 17 is arranged.

Preferably, the first combustion chamber 6 is provided with an additional inlet valve 15', whereas the second combustion chamber 7 is provided with an additional inlet valve 17'.

The energy converter is further provided with for example, sensors, actuators and a control unit (not shown) which are further described below.

The first outlet valve 14 is controlled by a first outlet valve control unit 20 and the first inlet valve 15 is controlled by a first inlet valve control unit 21. Furthermore, the second outlet valve 16 is controlled by a second outlet valve control unit 22 whereas the second inlet valve 17 is controlled by a second inlet valve control unit 23.

If the additional inlet valve 15' is provided, it is suitably controlled by an additional inlet valve control unit 21'. In a similar manner, the additional inlet valve 17' is controlled by a further inlet valve control unit 23'.

The control units 20, 21, 21', 22, 23, 23' are shown in FIG. 1 as separated units, but may be implemented as functions in a single control unit (as described below, with reference to FIG. 2) for controlling all the valves 14, 15, 15', 16, 17, 17'.

Although the embodiment shown in FIG. 1 includes inlet and outlet valves 14, 15, 15', 16, 17, 17' which are all controllable, the invention is not limited to such an embodiment only. In fact, the invention can be implemented in a manner so that either one of the inlet valve 15 and outlet valve 14 (of the first combustion chamber 6) is controllable, or both. In a similar manner, either one of the second inlet valve 17 and the second outlet valve 16, or both, can be controlled. In embodiments of the invention in which not all valves are controllable, such valves can be in the form of a permanently open valve opening.

FIG. 1 also schematically shows an example of a flow system for leading and handling of air and exhaust gas to and from one of the combustion chambers; in this case, the first combustion chamber 6. A similar system (not shown) is arranged in connection to the second combustion chamber 7. The incoming air is led to a compressor 24, driven by a first electrical motor 25 and passes a first cooler 26 before it enters the first combustion chamber 6. The exhaust gas leaves the first combustion chamber 6 through the first outlet valve 14, via a turbine 27 connected to an electrical generator 28, and further to the surrounding atmosphere. Part of the exhaust gas flow, the so called EGR-flow, is led via a second cooler 29 back to the compressor 24 where it mixes with the incoming air. Of course this flow system may be designed in many different ways that a person skilled in the art will recognize and be familiar.

The energy converter according to a preferred embodiment of the invention also comprises a capacitor and a battery (not shown).

Figure 2:
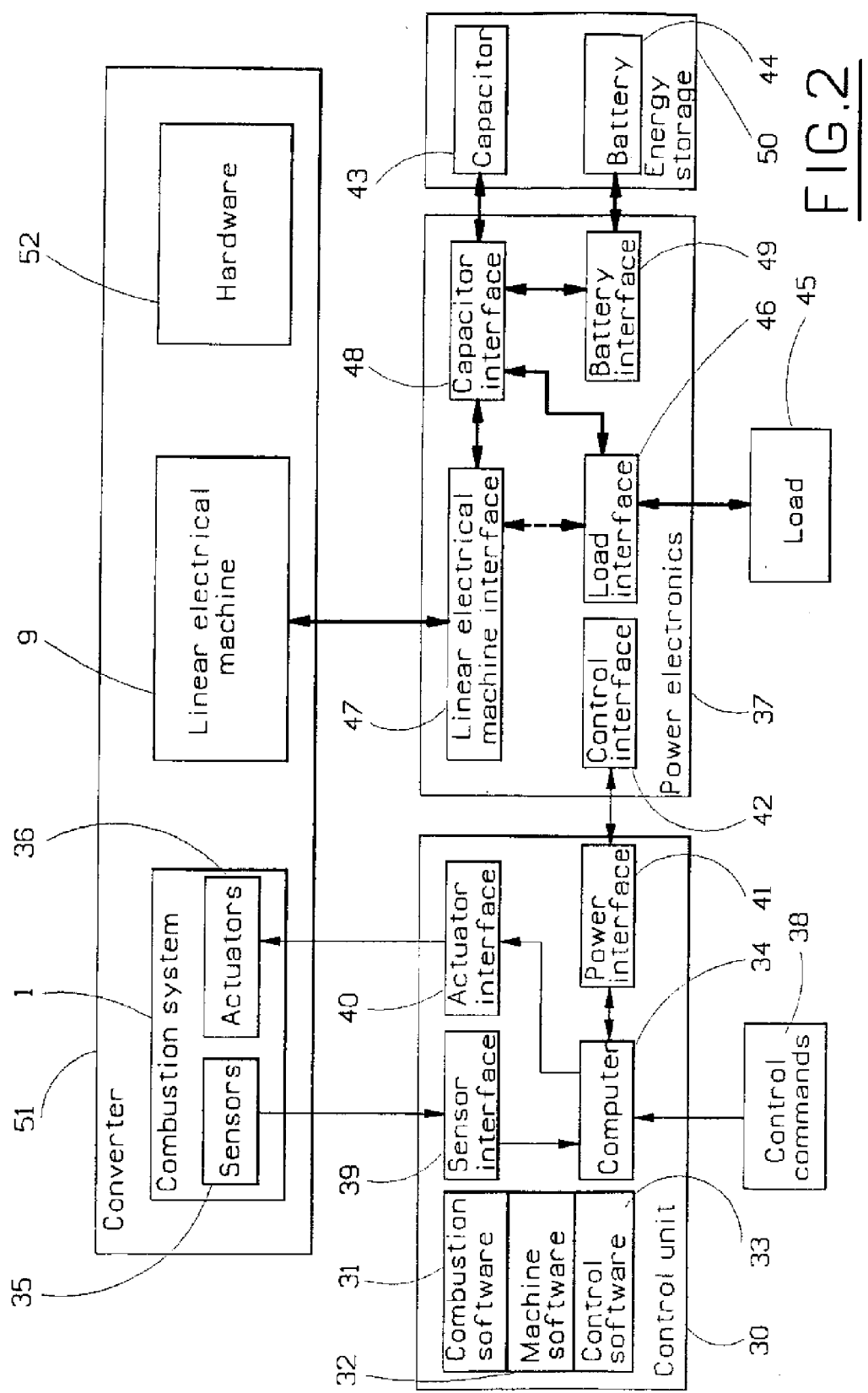
FIG. 2 is a schematic view of a control unit and main power paths according to a preferred embodiment of the invention.

FIG. 2 shows schematically a control unit 30 and main power paths according to the invention. The control unit 30 comprises various software modules such as combustion software 31, electric machine software 32 and control software 33. Furthermore, the control unit 30 comprises computer means 34, and interfaces for sending and/or receiving information from combustion sensors 35 and actuators 36, power electronics 37 and control commands 38. The interfaces include a sensor interface 39 (for communicating with said sensors 35), an actuator interface 40 (for communicating with said actuators 36, and also the compressor 24/25) and a power interface 41 (for communicating with said power electronics 37). Such communication is indicated by thin arrows in FIG. 2.

The computer means 34 include a microprocessor, memory, input and output circuits/drivers, A/D and D/A converters and the like (not shown), and which are well known to persons skilled in the art. The control unit 30 can be connected to further electronic units (not shown) by means of a computer bus. The power electronics 37 comprises a control interface 42 for communication with the above-mentioned power interface 41 in the control unit 30 and interfaces for distributing power between the electric machine 9, the capacitor 43, the battery 44 and an external load 45. These interfaces include a load interface 46 (for cooperating with the load 45), a linear electrical machine interface 47 (for cooperating with the electric machine 9), a capacitor interface 48 (for cooperating with the capacitor 43) and a battery interface 49 (for cooperating with the battery 44). The capacitor 43 and the battery 44 together form an energy storage unit 50, as indicated schematically in FIG. 2.

Furthermore, the main power paths in the power electronics 37 are indicated with bold arrows. Power may also be distributed for operation of, for example, the compressor (see FIG. 1). The power electronics 37 further comprises communication paths, e.g. between the control unit 30 and the electric machine 9 (not shown). FIG. 2 also shows the principal content of the energy converting parts, shown schematically by reference numeral 51: the combustion system 1, including, for example, the flow system; the linear electrical machine 9; and miscellaneous hardware 52.

The combustion system comprises sensors 35 for such things as pressure, temperature, knocking, air mass flow, piston position and piston acceleration, as well as actuators for controlling such things as fuel injection, valves and turbines.

The sensors 35 are connected to inputs on the control unit 30 and actuators 36 are connected to the output. For instance, the position sensor gives a signal corresponding to the relative position of the rod 8, such as for the position of the pistons. Other parameters that could be inputted to the control unit 30, either directly through separate sensors or through the data bus, are engine temperature, cooling water temperature, vehicle speed, momentary current flow and the like. These parameters are evaluated by the control unit and depending on predetermined limits, the control unit 30 controls the current flow through the electric machine 9.

The computer means 34 in the control unit 30 is provided with software that is arranged to simulate and predict the piston movement and the variations of pressure and temperature of the fuel/air-mixture in the combustion chambers.

The main function of the capacitor 43 is to act as an energy buffer between the engine strokes. The main function of the battery 44 is to charge the capacitor 43 at the start of the engine. The capacity of the capacitor 43 may be relatively small (e. g. 200 Ws) and the battery 44 can be an ordinary vehicle starting battery. Various types of capacitors and batteries may of course be used.

According to known systems, an FPE energy converter can be adapted to provide good combustion conditions, resulting in high efficiency and low emissions, by operating the engine at constant frequency and load. Energy is stored in a battery pack. When a conventional FPE is used in, for example, a vehicle, it will be dimensioned for providing the average power needed by the vehicle. This means that at times the power consumption by the vehicle can be many times larger than the power output of the generator. This type of vehicle thus requires a large and heavy battery pack. It is however desirable in vehicle applications to have a small and light battery. This is not possible with known FPE—either a large battery pack is required or the FPE must be dimensioned so that it can deliver the maximal power required by the vehicle. Such an FPE is not an efficient choice.

To solve this problem, it is necessary to control the free piston energy converter so that it can vary its output power. This is a fundamental idea of the invention. According to the invention, this power variation can be done by varying the following parameters: the amount of fuel per stroke, the amount of air per stroke, the compression and the number of strokes per time unit, and, for example, the operating frequency. At least one of these parameters can be controlled for providing the power variation in accordance with the invention.

The invention is not only limited to using the above-mentioned parameters. Additionally, the power variation can also be controlled by varying the following parameters: the EGR-flow via the second cooler 29, the inlet pressure (by means of the compressor 24) and the outlet back pressure (by means of the turbine 27).

The operating frequency is of great importance. The operation frequency of the combustion system is determined by its mass-spring characteristics: the oscillating mass, the stroke length, and the stiffness of the springs (air/combustion gases and/or a mechanical or hydraulic spring). To control engine power output in traditional crankshaft IC-engines, two measures are generally applied: control of load/amount of fuel per stroke, and control of engine speed/frequency. The oscillation frequency of a free piston engine is commonly regarded as being fixed by its lay-out. However, it can be varied by changing spring stiffness and stroke length.

Varying the stroke length has, however, a second effect: the amount of trapped air is also changed. Frequency and amount of air cancel each other out regarding power output. Therefore the main control of frequency is by varying the stiffness of the spring (s). This stiffness is strongly related to the charging pressure, i.e. the pressure of the incoming air, valve timing, i.e. the trapped amount of gas and maximum cylinder pressure in the combustion cycle. Also the variation of the charging pressure has two effects. In contrast to the variation of stroke length, they now go in the same direction: increased charging pressure increases the frequency and the amount of air. Charging pressure is therefore a strong control parameter for the power output. Even charging pressures below 1 bar absolute are interesting to control low loads, even though it costs extra fuel (pumping losses). With variable valve events, pumping losses can be avoided. The trapped gas mass can also be controlled by valve timing.

This means that one way of controlling the combustion system and thus the power output of the energy converter is by controlling the frequency by controlling the trapped gas mass. The trapped gas mass is controlled by charging pressure and valve timing. The control unit 30 (see FIG. 2) controls the opening times of the input and output valves 14, 15, 16, 17 (see FIG. 1). It further controls the compressor 24 that creates the pressure. Since the compressor 24 has a small time delay, this delay is taken into account when controlling the opening times for the valves.

HCCI combustion is characterized by a very fast heat release. The free piston movement is characterized by high piston speeds at the end of compression and beginning of expansion. These speeds are much higher than in a crankshaft engine, as the piston is not held by a crankshaft mechanism at top dead center. The combination of fast expansion and fast heat release fits very well together. The free piston engine needs a fast heat release to keep up with the expansion rate, and the HCCI combustion benefits from fast expansion after combustion completion.

Another advantage of the lack of a crankshaft mechanism is the automatic limitation of peak pressure. When the self-ignition starts relatively early during the compression stroke, the piston is slowed down by the combustion pressure which reduces the compression ratio and starts the expansion stroke earlier. A late self-ignition has the opposite effect. Principally, it can be said that the piston continues to compress the gases and increase gas temperature until self-ignition occurs. Then, the combustion pressure forces the piston back in the expansion stroke.

Additional variation of lambda or EGR will additionally increase the power range. Even the option of skip fire is possible when direct injection is applied (2N-stroke (N=1, 2, 3 . . . )).

Gasoline, compared to diesel, requires/allows higher temperatures with HCCI, which results in higher peak pressures, which results in higher frequency and power density.

The piston 'speed range' of a free piston engine is relatively small compared to a crankshaft engine, that is, piston movement does not change much. This gives better conditions for optimizing the combustion process and minimize emissions and fuel consumption. With a low friction free piston engine and an efficient generator, fuel consumption can be further decreased.

To be able to adapt the energy converter and the combustion system to varying loads, it is desirable to control the piston movement in each cycle, preferably both between and during the individual strokes. The HCCI combustion relies on self-ignition, which is very dependent on temperature, pressure and hence on compression ratio. The compression ratio is not geometrically determined, but is related to the piston speed at the end of compression. In the dual piston concept, the piston speed is dependent on the power from the previous stroke in the opposite cylinder, and the amount of power taken off by the electrical machine/generator. By varying the power taken off by the generator it is possible to even out cycle to cycle variations in the previous combustion and assure the correct compression ratio. To be able to do that, the piston speed must be determined and adjusted from cycle to cycle. This requires a fast and accurate speed determination and motor/generator response. Some recently invented electric machines provides this necessity. Examples of linear electric machines that may be suitable in this context are presented in WO 01/78218 and WO 01/78219.

The actual load requirements are analyzed by the control unit 30. The control unit 30 may obtain information on the load requirements via a sensor at the load interface 46 that, for example, reads the required current or voltage, or by receiving control commands based on (change of) accelerator pedal position or vehicle driving conditions (previous, present, calculated future) or sensor signals for voltage drop or current interruption.

As mentioned previously, prior art FPE, energy converters handle power peaks with batteries. A large battery pack is connected to the generator, which feeds the battery pack with a constant charge current. To save weight and cost, it is desirable to minimize the amount of batteries. A small battery pack cannot, on the other hand, deliver the required current at power peaks. According to the invention, this problem is solved by adjusting the energy converter depending on the actual load. By adapting the combustion system to the load, the required current from the generator can be delivered. With the fast response time of the energy converter according to the invention, it is possible to use only a conventional starter battery as the battery pack.

In a preferred embodiment of the inventive energy converter, a capacitor or a super capacitor is used as the operational energy storage facility instead of a battery. A (super) capacitor makes it possible to store energy and obtain stored energy more quickly than by using a battery. Further, a (super) capacitor has a higher energy to weight factor than a battery and also a longer service life. A small battery will however be needed to start the engine when it has been shut off for some time. The self discharge of capacitors appears presently to be too fast to make them suitable for use as a starter battery.

Operation of the Invention: Operation of the invention will now be described with reference to FIGS. 1 to 12. The start behavior (of which a cold start is a special case) of the FPE is preferably performed according to the following principal description.

1. The pistons start out from a position as far to the left as possible with reference to FIG. 1 (x=−half the stroke length).

2. The electric machine 9 (see also FIG. 1) accelerates the pistons 2, 3 to the right with both cylinders 4, 5 open (i.e. all valves 14, 15, 16, 17 are open).

3. The inlet valves of the second cylinder 5 are closed at an x-position (piston displacement) that gives a desired compression.

4. Fuel is fed to the second cylinder 5.

5. When the pistons 2, 3 reach their maximum x-value, i.e. a position as far to the right as possible with reference to FIG. 1, the combustion is initiated in the second cylinder 5.

6. During the expansion stroke part of the energy of the moving piston is taken up by the electric machine 9 and is stored in the capacitor 43. The remaining energy is used for compression in cylinder 6 and continuation of the operation.

In this way, the engine can be started in a fast and efficient way and reach working conditions in half a cycle.

The combustion system preferably comprises a NOx-trap and a catalytic converter for treating the exhaust gas (not shown). Exhaust gases from the cold start (before the engine is heated to working conditions) are preferably stored in the NOx-trap in a known fashion until the exhaust gases have reached the light-off temperature for the catalytic material.

This novel start behavior is very quick and environmental friendly since it does not produce any excessive exhaust gases.

The electric machine 9 is controlled instantaneously so that the combustion is initiated in an optimal piston position. Valves, fuel injection and charging pressure are controlled so that a desired operation is achieved with regard to the required load. The electric machine 9 is controlled by the control unit 30 so that it instantaneously can deliver desired force in the desired direction. Further, the control unit 30 receives instantaneously information about the status of the electric machine 9. The electrical energy produced by the electric machine 9 is stored in the capacitor 43 (and in the battery 44 if necessary) and/or is transferred to the load 45, e.g. a driving mechanism for a car. During start and intensive controlling a high effect can be taken from the capacitor 43.

Continuous operation of the combustion system according to the invention may be performed in a 2-stroke or 4-stroke mode in accordance with traditional combustion engines. A 4-stroke mode is achieved by letting one of the cylinders, temporarily or permanently, act as a gas (air) spring with closed valves.

Figure 3:
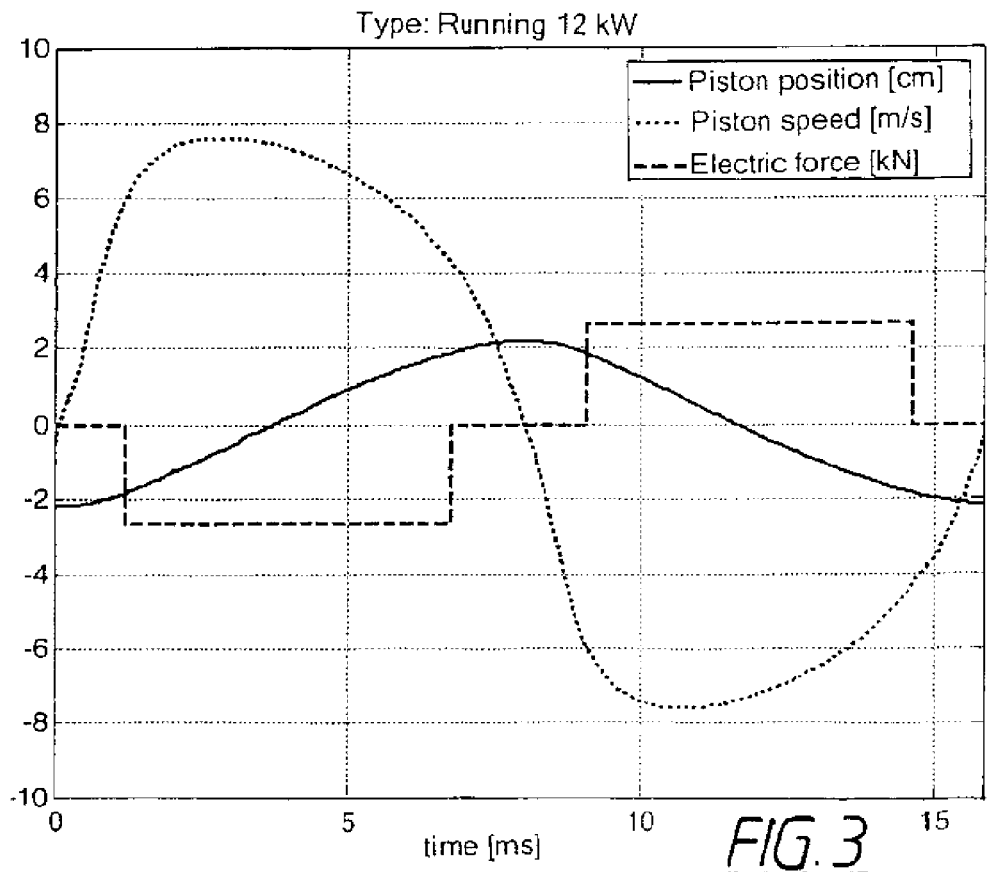
FIG. 3 shows simulation results from an example of a continuous operation of a preferred embodiment of the invention.
Figure 4:
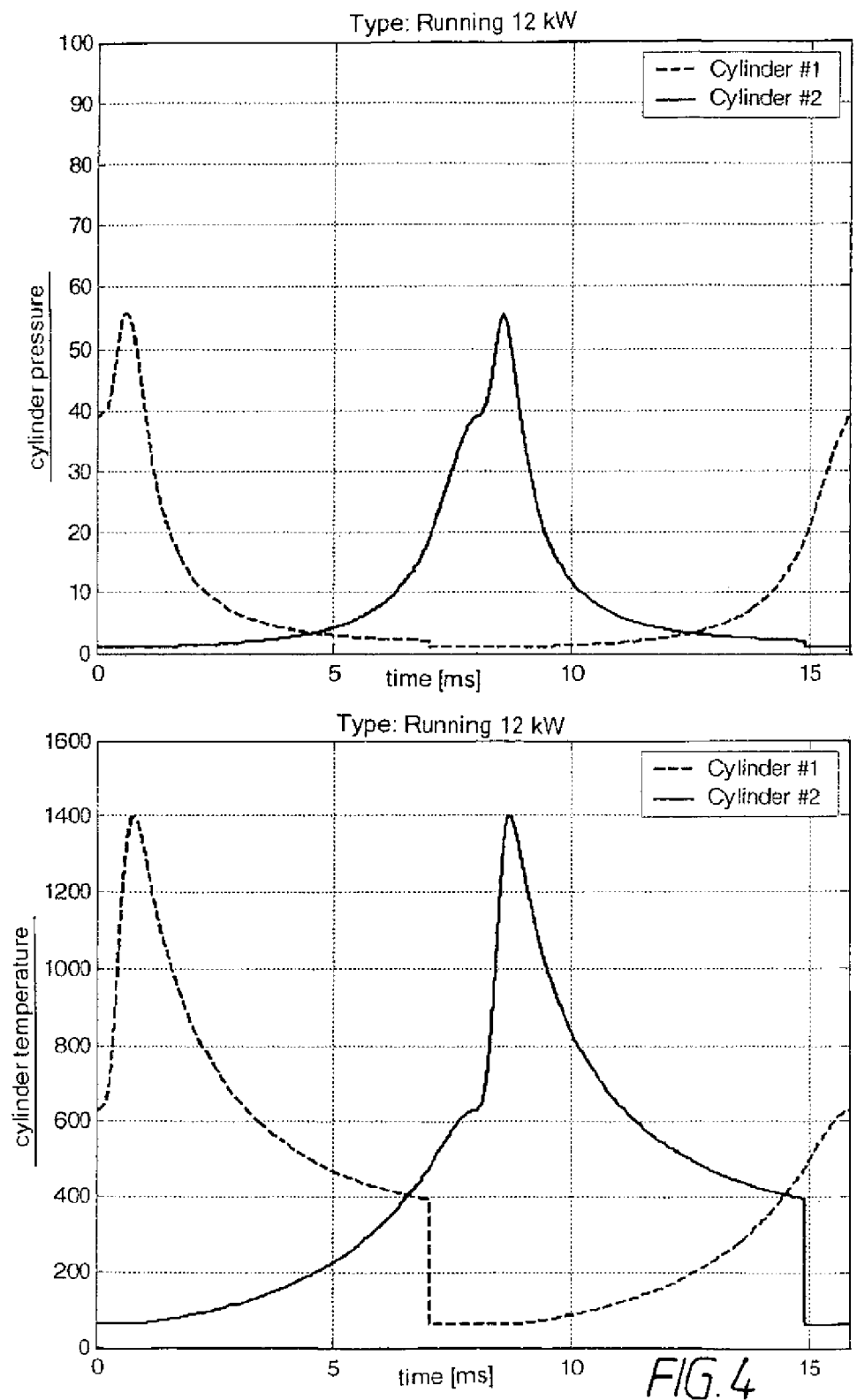
FIG. 4 shows further simulation results according to FIG. 3.

Simulation results from an example of a continuous operation of the energy converter is shown in FIGS. 3 and 4 ("Type: Running. Case: 63 C, 1 bar.").

Previous FPE energy converters are run at a constant speed and power, and need large energy buffers such as batteries as a back-up for high-load situations. The energy converter according to the invention on the other hand can be controlled to deliver the required load by changing the operation mode of the combustion system. Mode-switches within continuous operation is described further below. The energy converter according to the invention makes it possible to run the converter in a novel and efficient way.

In situations where only a small amount of power output is needed, the energy converter according to the invention can be operated in an intermittent mode, that is, a mode in which the combustion system is alternatingly on and off and where only one or a few combustion cycles are performed each time the combustion system is on. Such an intermittent mode makes it possible to use a very small energy buffer. As the charging of the capacitor drops below a certain value, one or a few combustion cycles are performed for recharging. The energy converter according to the invention is thus capable of delivering energy continuously although the combustion system works intermittently. During intermittent operation, the frequency of the combustion system, seen over a time period much longer than a few combustion cycles, is low compared to the continuous operation.

Figure 6:
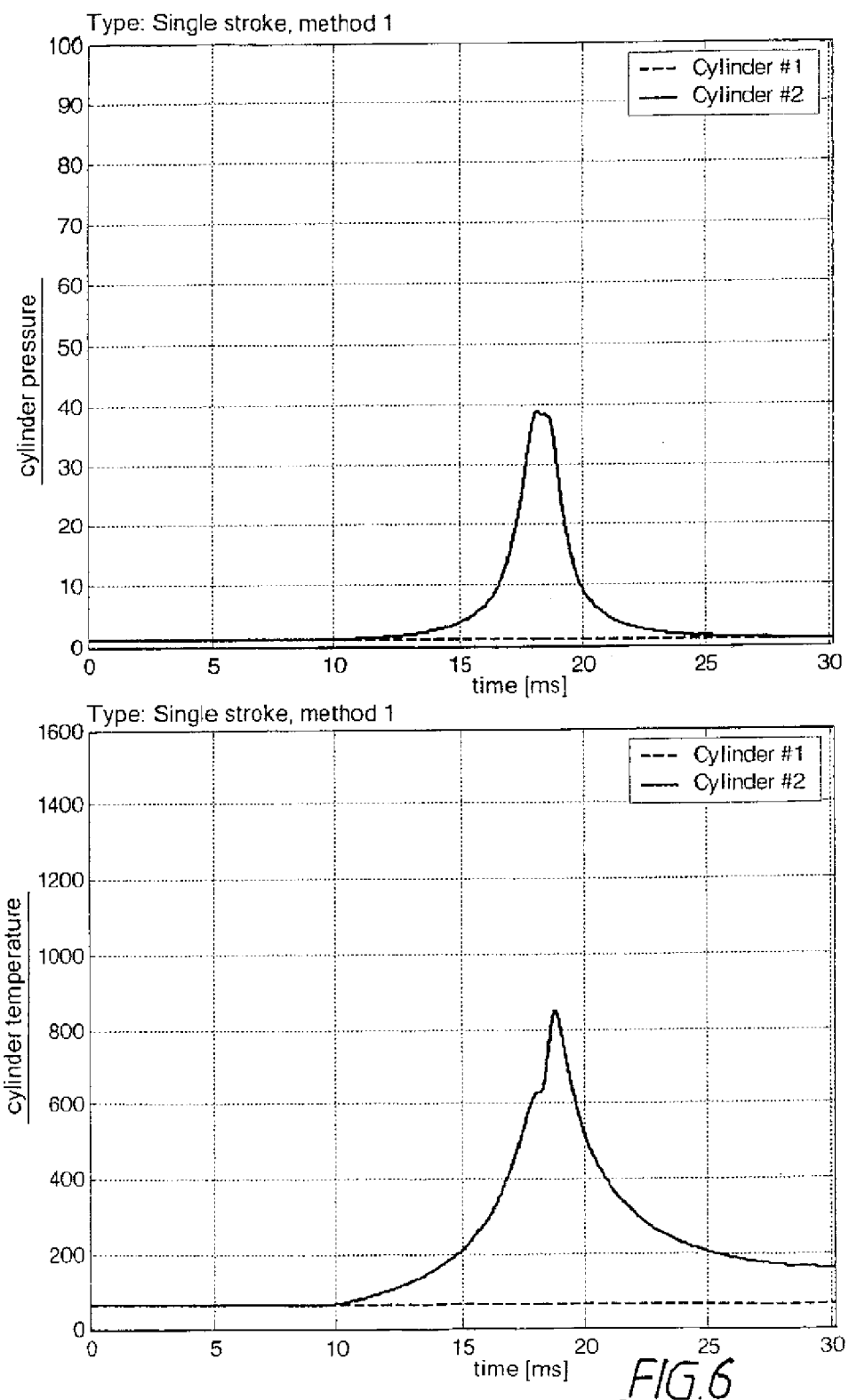
FIG. 6 shows further simulation results according to FIG. 5.

Simulation results from such an intermittent mode (a first example of one-cycle operation) is shown in FIGS. 5 and 6 ("Type: Single stroke 1. Case: 63 C, 1 BAR."). This first example includes the following steps:

1. The pistons start out from a position as far to the left as possible with reference to FIG. 1 (x=–half the stroke length).
2. The electric machine 9 (see also FIG. 1) accelerates the pistons 2, 3 to the right with both cylinders 4, 5 open (i.e., all valves 14, 15, 16, 17 are open).
3. The valves of the second cylinder 5 are closed at an x-position (piston displacement) that gives a desired compression.
4. Fuel is fed to the second cylinder 5.
5. When the pistons 2, 3 reach their maximum x-value, i.e. a position as far to the right as possible with reference to FIG. 1, the combustion is initiated in the second cylinder 5.
6. During the expansion stroke the energy of the moving piston is taken up by the electric machine 9 and is stored in the capacitor 43. The valves 14, 15 of the first cylinder 4 are still open.
7. The pistons 2, 3 stay in their left waiting position as described in step 1 above.
8. The energy in the capacitor 43 is used by the load 45.
9. When it is time for recharging the capacitor 43 (step 6) steps 1 to 8 are repeated.

This means that in order to start in half a cycle, the invention comprises injection into the cylinder, at least one controllable valve for determining the amount of air, and the possibility of positioning the pistons at an end position, and also instantaneous control during the cycle.

Figure 8:
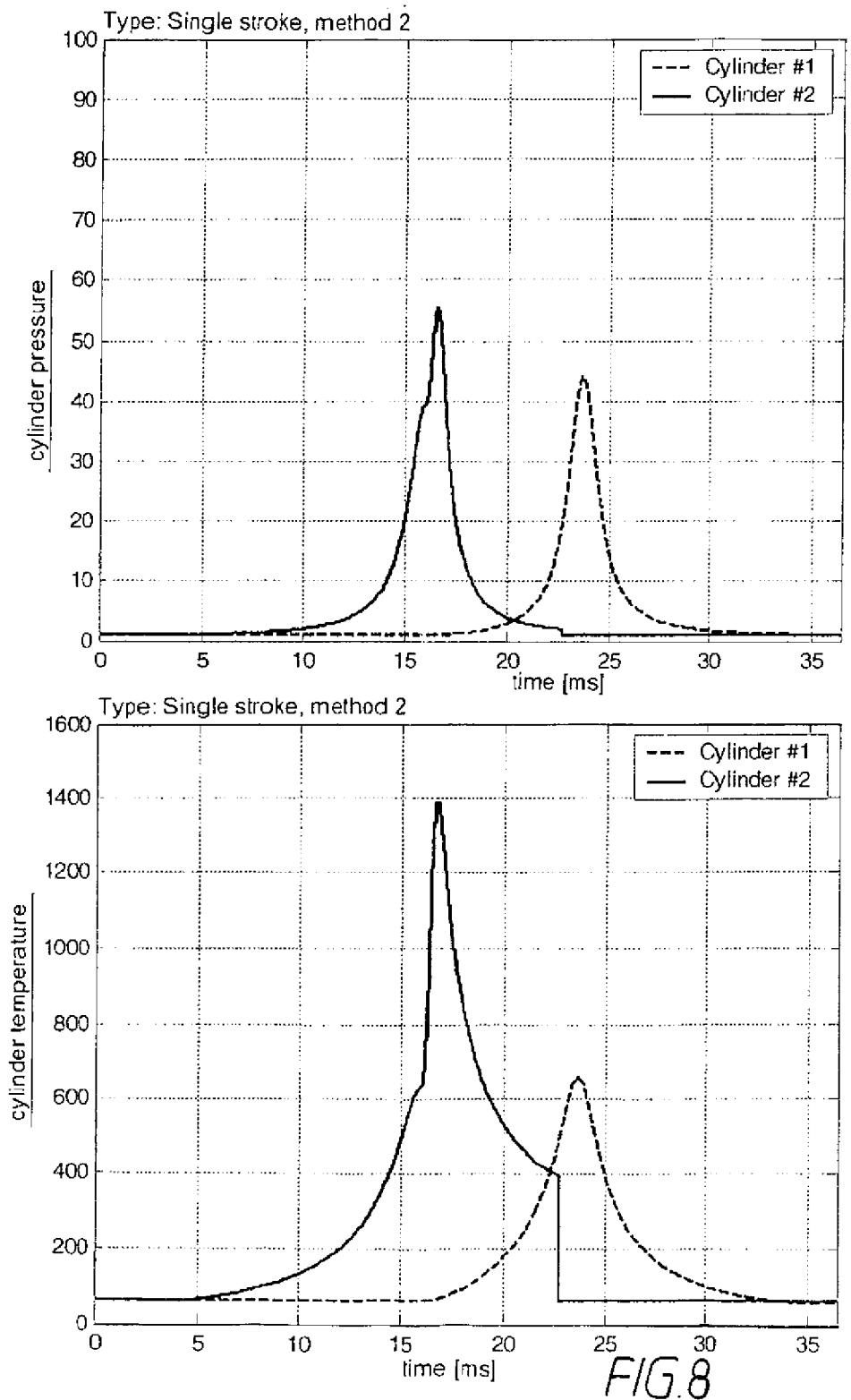
FIG. 8 shows further simulation results according to FIG. 7.

Simulation results from a second example of one-cycle operation is shown in FIGS. 7 and 8 ("Type: Single stroke 2. case: 63 c, 1 bar."). This second example includes the following steps:

1. The pistons 2, 3 start out from a position as far to the left as possible with reference to FIG. 1 (x=–half the stroke length).
2. The electric machine 9 accelerates the pistons 2, 3 to the right with both cylinders 4, 5 open (i.e. all valves 14, 15, 16, 17 are open).
3. The valves of the second cylinder 5 are closed at an x-position (piston displacement) that gives a desired compression.
4. Fuel is fed to the second cylinder 5.
5. When the pistons 2, 3 reach their maximum x-value, i.e. a position as far to the right as possible with reference to FIG. 1, the combustion is initiated in the second cylinder 5.
6. The valves 14, 15 of the first cylinder 4 close at a suitable point of time.
7. During the expansion stroke the energy of the moving piston is taken up by the electric machine 9 and the gas spring formed in the first cylinder 4. Energy is stored in the capacitor 43.
8. As the pistons 2, 3 have rebound off the gas spring in the first cylinder and are moving towards the second cylinder 5, the pistons 2, 3 are slowed down by the electric machine 9 which takes up and transfer the energy to the capacitor 43.
9. The pistons 2, 3 are brought back to a waiting position, either to the far left (as described above) or to the far right.
10. The energy in the capacitor 43 is used by the load 45.
11. When it is time for recharging the capacitor 43 (steps 7 and 8) steps 1 to 10 are repeated.

Compared to the first example of one-cycle operation, this second example allows for a higher combustion energy since (at least) two strokes are used for slowing down the pistons 2, 3.

The second example of one-cycle operation described above is also useful for starting a continuous operation. Such a starting process makes it possible to deliver output power after a very short time. As can be seen from FIG. 7 that the electric machine 9 starts to deliver power after about 17 ms. If the energy converter has been shut off for some time it may be necessary to initially charge the capacitor 43 from the battery 44, typically this takes around 200 ms. This time delay can however be avoided by using the battery 44 to keep the capacitor 43 fully charged during the time the converter is shut off.

Figure 10:
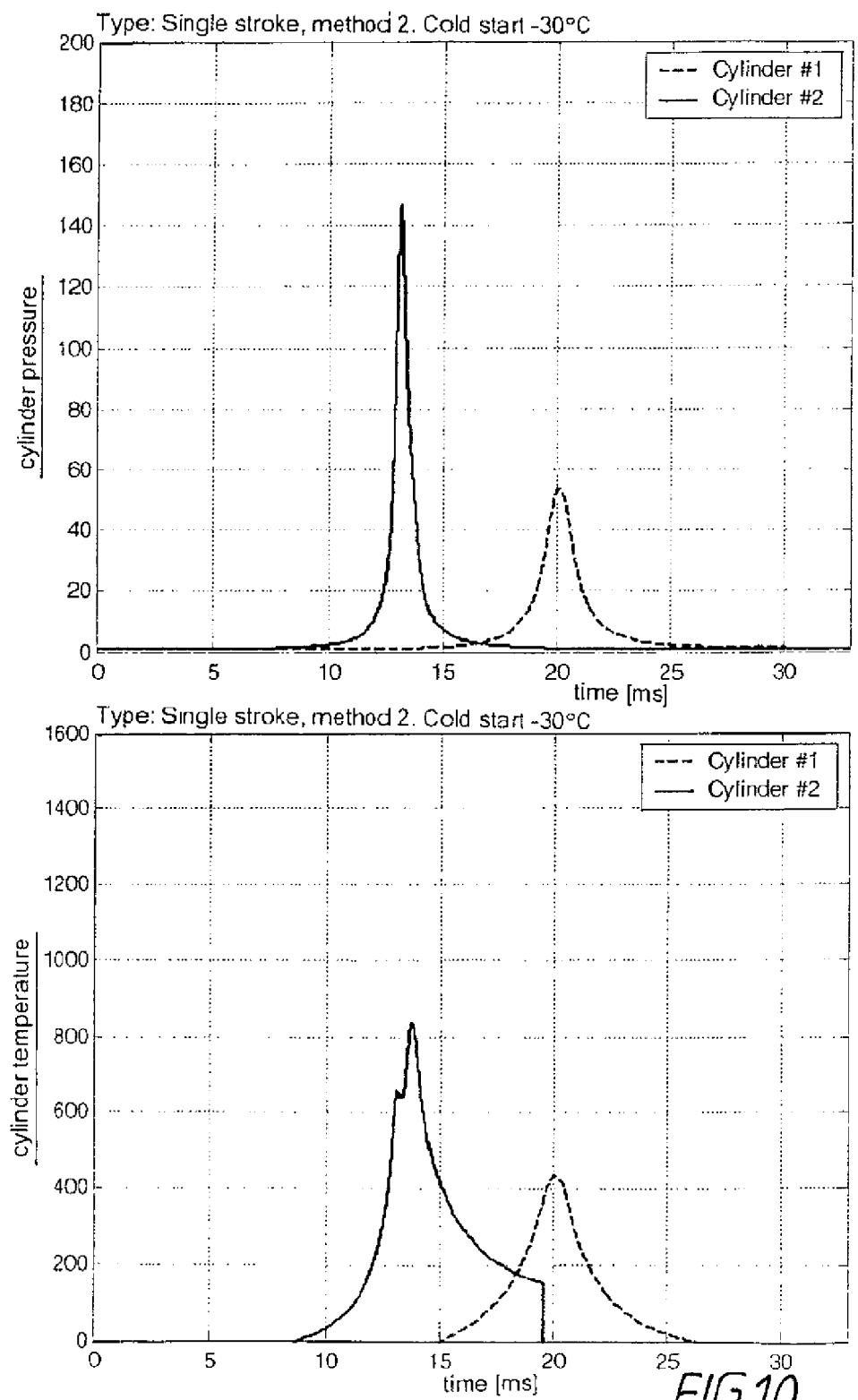
FIG. 10 shows further simulation results according to FIG. 9.

A cold start is a special case starting process since considerable compression is required to achieve the autoignition temperature. The principles of the second example ("single stroke 2") described above is suitable for a cold start situation. Simulation results from such a cold start process are shown in FIGS. 9 and 10 ("Type: Single stroke 2. Case: 63 C, 1 bar.").

By choosing to close the valves of the second cylinder 5 (step 3) at a late stage, resulting in a smaller amount of gas entrapped in the second cylinder 5, it is possible to make the force of the electric machine 9 sufficient for compressing even cold gas sufficiently for ignition within one stroke.

The stopping procedure is performed in a similar way. When the combustion system is to be stopped, the fuel mixture is ceased. At the same time, the control unit 30 applies a current to the electric machine 9 in such a way that the force from the electric machine 9 to the rod is in the opposite direction to the movement of the rod. When the rod 8 reaches e.g. its central position, the current is released and the energy converter is stopped.

According to a further example, simulation results of an operating situation involving a relatively high power are described with reference to FIGS. 11 and 12 ("Type: Running. 39 KW—high power with supercharging"). This situation corresponds generally to what is described with reference to FIGS. 3 and 4, but involves a considerably higher power of the energy converter according to the invention and also considerably higher cylinder pressure and cylinder temperatures.

FIGS. 3-12 show examples of principal simulations of different running modes for an energy converter such as the preferred embodiment of the invention shown in FIG. 1. The pistons 2, 3 and the moving part of the electrical machine 9 are accelerated by the sum of the forces produced by the cylinder pressures and the electrical machine 9. In a continuous running mode these forces are balanced (as an average) and the pistons 2, 3 are oscillating between the left and right turning points. The parameter section shown first for every different mode is not necessary for the understanding the principles and is not explained further.

The first diagram (of three) for each running mode shows the piston displacement (expressed in centimeters), x, referring to the pistons' 2, 3 central positions; the piston velocity (expressed in meters per second); and the force (El-force) (expressed in kilo-Newtons) produced by the electrical machine. To get high efficiency the electrical machine 9 is preferably only active when the piston velocity is high and the "El-force" is therefore, in these examples, zero around the turning points of the pistons. If the piston velocity and the "el-force" have the same signs the electrical machine 9 works as a motor which means that the pistons 2, 3 are accelerated by the electrical machine 9.

On the other hand, if the piston velocity and the "el-force" have different signs, the electrical machine 9 works as a generator which means that the pistons 2, 3 are retarded by the electrical machine 9. The energy converter produces power when the electrical machine 9 works as a generator. The second diagram for each running mode shows the cylinder pressure in the two cylinders. The control unit 30 has controlled the operation to get ignition (in these examples for the HCCI combustion) near the turning points of the pistons. The third diagram for each running mode shows the cylinder (combustion) temperatures in the two cylinders.

FIG. 3 shows the piston displacement, the piston velocity, and the force produced by the electrical machine in a continuous running mode.

FIG. 4 shows the cylinder pressures and the cylinder temperatures in a continuous running mode.

FIG. 5 shows the piston displacement, the piston velocity, and the force produced by the electrical machine in a single stroke mode type 1. The pistons 2, 3 are first accelerated by the electrical machine 9 from their left position (minimal x value) to the right turning point where the combustion takes place in cylinder number 2. In the stroke from the right turning point the pistons 2, 3 are retarded and stopped by the electrical machine 9.

FIG. 6 shows the cylinder pressures and the cylinder temperatures in a single stroke mode type 1. Note that the cylinder 4 is inactive (valves are open) in the whole cycle. Furthermore the valves are closed late (in this particular example) in the compression stroke for cylinder 5.

FIG. 7 shows piston displacement, piston velocity, and the force produced by the electrical machine 9 in a single stroke mode type 2. The pistons 2, 3 are first accelerated by the electrical machine 9 from their left position (minimal x value) to the right turning point where the combustion takes place in the second cylinder 5. In the stroke from the right turning point the pistons 2, 3 are retarded by the electrical machine 9. In this single stroke mode the pistons 2, 3 has a left turning point where the first cylinder 4 acts as a gas spring. In the stroke from this left turning point the electrical machine 9 converts the remaining part of the movement to electrical energy and the pistons 2, 3 are stopped.

FIG. 8 shows the cylinder pressures and the cylinder temperatures in a single stroke mode type 2. The first cylinder 4 is inactive (valves are open) in the stroke from the left start position to the right turning point. At the left turning point there is no combustion in the first cylinder 4 (gas spring). In the stroke from the left turning point the second cylinder 5 is inactive (valves are open).

FIG. 9 shows the piston displacement, the piston velocity, and the force produced by the electrical machine in a single stroke mode type 2 at low temperature, cool start. The pistons 2, 3 are first accelerated by the electrical machine 9 from their left position (minimal x value) to the right turning point where the combustion takes place in the second cylinder 5. In the stroke from the right turning point the pistons 2, 3 are retarded by the electrical machine 9. In this single stroke mode the pistons has a left turning point where the first cylinder 4 acts as a gas spring. In the stroke from this left turning point the electrical machine 9 converts the remaining part of the movement to electrical energy and the pistons 2, 3 are stopped.

FIG. 10 shows the cylinder pressures and the cylinder temperatures in a single stroke mode type 2 at low temperature, cool start. Note that the valves for the second cylinder 5 are closed late in the compression stroke to make it possible achieve the very high compression needed to reach the ignition temperature.

The first cylinder 4 is inactive (valves are open) in the stroke from the left start position to the right turning point. At the left turning point there is no combustion in the first cylinder 4 (gas spring). In the stroke from the left turning point the second cylinder 5 is inactive (valves are open).

FIG. 11 shows the piston displacement, the piston velocity, and the force produced by the electrical machine in a situation involving a high power of the energy converter according to the invention and in particular, a higher charging pressure from the compressor 24. The diagram according to FIG. 11 generally corresponds to FIG. 3 but involves a higher speed of the two pistons 2, 3 and a higher electric power of the electric machine 9.

Figure 12:
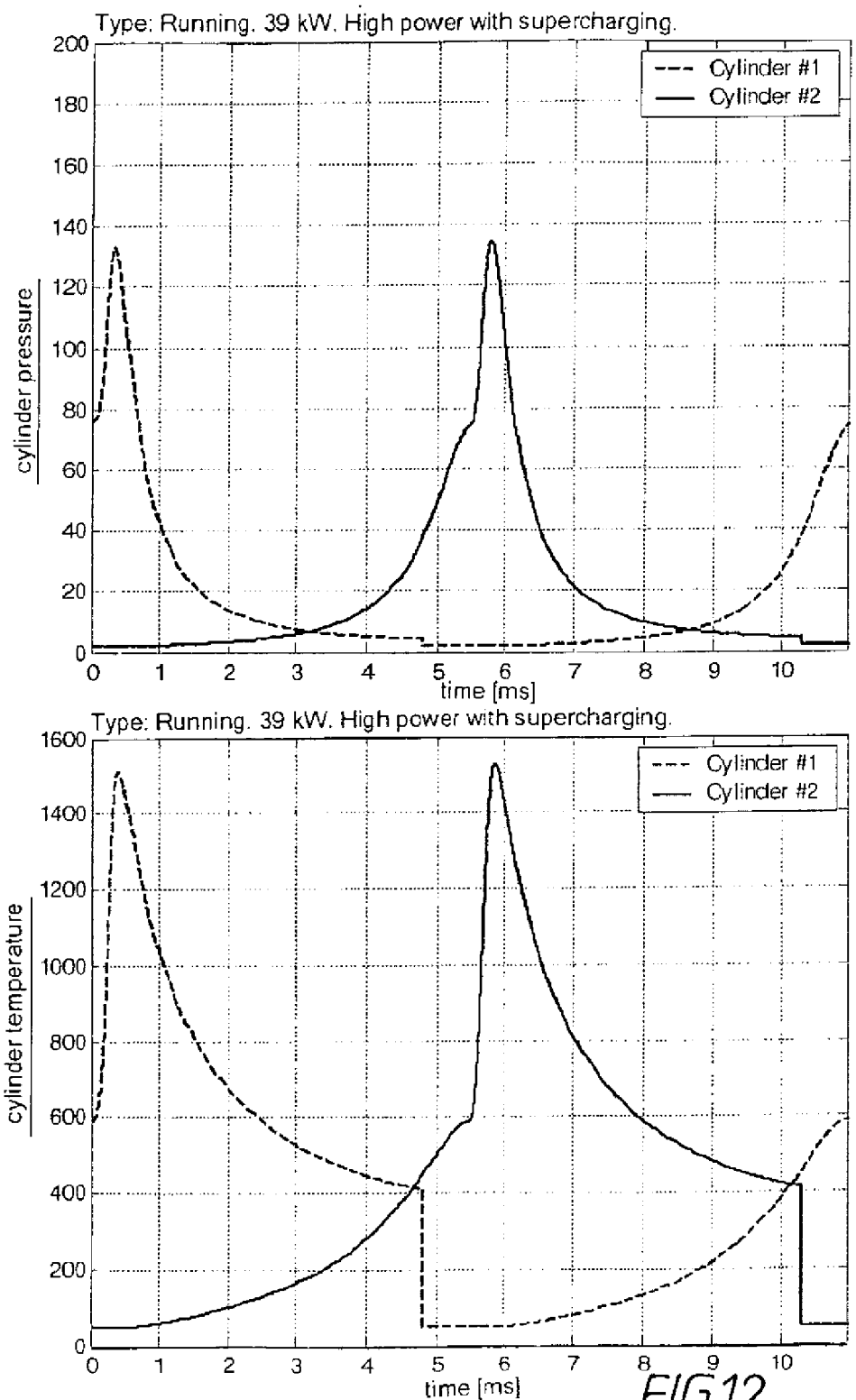
FIG. 12 shows further simulation results corresponding to FIG. 11.

FIG. 12 shows the cylinder pressures and the cylinder temperatures in an operating condition according to FIG. 11, for example, involving a high power of the energy converter.

In contrast to known FPES, the starting process of the combustion system described herein does not require an oscillation procedure. As described above, the combustion system can be started within one stroke, even under cold-start conditions. Consequently the energy converter according to the invention can give power output in a very short time. The very quick and simple starting and stopping procedures of the energy converter according to the invention makes it possible to run the converter in a novel way concerning start and stop. Previous FPE energy converters have relatively complicated starting and stopping procedures and need large energy buffers such as batteries as a back-up for the time required for the starting procedure. In contrast, the energy converter according to the invention can use its quick starting procedure to eliminate the need for such large energy buffers.

This is of particular interest in low load situations where the converter can be operated in the intermittent mode; for example, one-cycle operation, or even being shut off. One example is when the converter is used in a hybrid vehicle that runs in a city where low load situations arise at traffic lights, in case of traffic jam and the like. The engine may, in such a case, switch to one-cycle mode which might be close to being shut off depending on the status and capacity of the battery and how much energy is needed for lights, radio etc. The time period between the strokes may of course be varied. Another example is when the converter is used in a reserve power application. Since the invention makes it possible to obtain power as quickly as in the order of a period of net frequency (20 ms for 50 Hz), the very large back-up system of batteries/capacitors in traditional reserve power plants can be dramatically decreased. Naturally, if the invention is used in such an emergency application the capacitor should be kept fully charged during the time the converter is not in use.

The load control of the energy converter according to the invention is very flexible. Firstly, a number of different combustion modes can be selected, such as: intermittent mode (e.g., one-cycle operation), 2-stroke mode, 4-stroke mode, 6-stroke and the like.

Secondly, the combustion principle can be selected, and including compression ignited combustion and spark ignited combustion (provided that the combustion system is provided with spark plugs). Thirdly, one may select with or without skip-fire, by elimination of fuel injection and/or spark ignition.

A fourth selection is possible since the following traditional combustion control methods may be selected within a certain running mode:

Ignition timing by spark ignition,
Ignition timing for compression ignition,
Pressure charge level (by using a pressurized air tank buffer),
Late or early fuel injection, or a combination of both, with one or multiple fuel injections at each timing,
Different valve actuation selection such as late or early intake valve closing and/or late or early exhaust valve closing; and
EGR level control by e.g. positive or negative valve overlap The selections above can be changed from cycle-to-cycle as the energy converter according to the invention has the ability to prepare shift operation mode within one piston stroke, achieved by the within-one-stroke control ability of the electric machine and by the fuel and valve actuators.

The selection of combustion mode depends on the outer requirements. Examples of such requirements are: cold start and warm start instantaneous load level requirement phase position requirements in relation to other co-operated converters load level requirement predictions for the nearest set of strokes (by derivative or control unit history self learning functions). Instantaneous combustion system emission requirement Emission requirement prediction for the nearest sets of combustion strokes Emission system status (e.g. NOx-trap status, oxygen storage status etc) Depending on the combination of these requirements different combustion mode settings can be used. One, out of several different combustion mode settings, that exhibits the best fit to the running demands can be selected from cycle to cycle.

In this way both the stationary and transient output torque of the energy converter according to the invention can be optimized for minimum fuel consumption and emission levels, without need for any additional load leveling capacitor or battery.

An energy converter according to the invention has several advantageous effects: very high efficiency, very low fuel consumption, very low emissions and it eliminates/decreases the need for large battery stacks. The latter contributes to efficiency because there are energy losses associated with battery systems and it also makes the energy converter system relatively cheap and light, as batteries generally are costly and heavy.

The invention can be used to avoid the traditionally negative consequences of misfire in the combustion chamber. Normally, unburnt fuel leaves the engine via the exhaust pipe. By using the sensors to detect the misfire, the control unit to take adequate actions (such as keeping the valves closed) and the electric machine to aid in the following compression in the other combustion chamber, the unburnt fuel can be kept in the combustion chamber until the piston returns the next time.

An FPE normally needs to be balanced. In order to do this, two energy converters may be arranged after each other with the rods in a line. Each converter may have the general design outlined in FIG. 1. Balance can be achieved by operating the two rods totally in anti-phase, controlled by communication between the control units of the converters. The individual phase position of the two rods can be adjusted by redistributing the effect output within one stroke with maintained conditions at the end positions of the pistons. Two energy converters arranged in a line may have one cylinder and thus one combustion chamber in common.

A system comprising more than one energy converter may be arranged offset in phase so that power is delivered continuously or almost continuously from the electric machines. Such an arrangement decreases the need for capacitors.

In another aspect, the energy converter may be used as an engine brake. A control command from, for example, the brake pedal to the control unit can be used to initiate a procedure where the combustion process is stopped and the braking energy is used to move the rod/pistons to compress only air in the cylinders. By closing and opening valves, and releasing the compressed air at adequate moments the energy converter will aid in the braking process. The compressed air may be stored in a pressure vessel for use as a compliment to charging.

As mentioned previously, the invention is preferably applied in hybrid vehicles and reserve power plant applications. Other preferred applications are as APUs (Auxiliary Power Unit) in marine vehicles and as main engines and APUs in work machines such as wheel loaders, articulated haulers, excavators etc.

The invention is not limited to what is described above but may be modified within the patent claims.

The number and position of the valves may be modified and inlet ports may be used as outlet ports and vice versa.

Even though the invention is described for a dual piston layout, it can also be utilized for a single piston layout which is well known to persons skilled in the art.

The expression "instantaneous" is in this context means to be a time period that is short compared to a combustion cycle.

Although HCCI combustion is very well suited for the energy converter according to the invention, conventional spark ignition is on some occasions favorable and could be applied for different reasons such as to start the engine at very low temperatures, to create the initial conditions for HCCI, or for example for mode transitions. Of course, spark ignition can also be used for longer periods in cases where this is beneficial for the performance of the energy converter.

What is claimed is:

1. An energy converter, comprising:
a free piston engine having a piston unit that comprises a) a piston or b) pistons that are connected together so as to reciprocate with each other; at least one combustion chamber provided with at least one inlet and at least one outlet and inlet and outlet valves, of which inlet and outlet valves at least one is controllable; and means for supplying fuel and a medium containing oxygen into the combustion chamber or chambers;
an electric motor/generator arranged to interact with the piston unit through electromagnetic coupling between the motor/generator and the piston unit so as to produce electrical energy from movements of the piston unit and to use electrical energy to affect the movements of the piston unit; and
a control unit that controls the free piston engine and the electric motor/generator;
wherein the energy converter is arranged to supply the control unit with information regarding required load, said energy converter also being arranged to adapt power output from said electric motor/generator depending on the required load of the energy converter.

2. The energy converter as recited in claim 1, wherein the control unit is arranged for controlling the electric motor/generator and at least one of the valves within a time period that is significantly shorter than a combustion cycle of said combustion chamber.

3. The energy converter as recited in claim 1, wherein the combustion chamber is provided with at least one fuel injector.

4. The energy converter as recited in claim 1, wherein the free piston engine is arranged for a compression ignition combustion principle.

5. The energy converter as recited in claim 1, wherein the combustion chamber is provided with at least one spark plug.

6. The energy converter as recited in claim 1, wherein the energy converter is configured to be used for propulsion of a vehicle or in a power plant application.

7. The energy converter as recited in claim 1, wherein the control unit is adapted for controlling at least one operating parameter selected from the group of operating parameters consisting of the amount of fuel per stroke, the amount of air per stroke, the compression, and the number of strokes per time unit.

8. The energy converter as recited in claim 7, wherein the operating frequency adapts the power output depending on the required load.

9. The energy converter as recited in claim 8, wherein the control unit is adapted for controlling said operating frequency by controlling charging pressure.

10. A method for operating an energy converter, comprising:
providing an energy converter having 1) a free piston engine including a piston unit that comprises a) a piston or b) pistons that are connected together so as to reciprocate with each other; at least one combustion chamber provided with at least one inlet and at least one outlet and inlet and outlet valves, of which inlet and outlet valves at least one is controllable; and supply means for supplying fuel and a medium containing oxygen into the combustion chamber or chambers; 2) an electric motor/generator arranged to interact with the piston unit through electromagnetic coupling between the motor/generator and the piston unit so as to produce electrical energy from movements of the piston unit as well as to use electrical energy to affect the movements of the piston unit; and 3) a control unit that controls the free piston engine and the electric motor/generator;
supplying the control unit with information regarding the energy converter's required load; and
adapting power output from said electric motor/generator depending on the required load of the energy converter.

11. The method as recited in claim 10, wherein the power output is controlled by varying the amount of fuel per stroke and/or the amount of the oxygen-containing medium per stroke.

12. The method as recited in claim 10, wherein the free piston engine further comprises a charging compressor and the power output is controlled by varying the charging pressure.

13. The method as recited in claim 10, wherein the power output is controlled by selecting from among at least two different combustion modes.

14. The method as recited in claim 13, wherein the at least two different combustion modes are selected from the group consisting of intermittent mode, one-cycle operation, 2-stroke mode, 4-stroke mode, and 6-stroke mode.

15. A method of starting an energy converter comprising:
providing an energy converter having 1) a free piston engine including a piston unit that comprises a) a piston or b) pistons that are connected together so as to reciprocate with each other; at least one combustion chamber provided with at least one inlet and at least one outlet and inlet and outlet valves, of which inlet and outlet valves at least one is controllable; and means for supplying fuel and a medium containing oxygen into the combustion chamber or chambers; 2) an electric motor/generator arranged to interact with the piston unit through electromagnetic coupling between the motor/generator and the piston unit so as to produce electrical energy from movements of the piston unit as well as to use electrical energy to affect the movements of the piston unit; 3) a control unit that controls the free piston engine and the electric motor/generator; and 4) a capacitor electrically connected to the electric motor/generator; and
storing in said capacitor electrical energy allowing said energy converter to provide power sufficient for it to be started within one stroke of said piston unit.

16. An energy converter, comprising:
a free piston engine having a piston unit that comprises a) a piston or b) pistons that are connected together so as to reciprocate with each other; at least one combustion chamber provided with at least one inlet and at least one outlet and inlet and outlet valves, of which inlet and outlet valves at least one is controllable; and means for supplying fuel and a medium containing oxygen into the combustion chamber or chambers;
a linear electric motor/generator arranged to interact with the piston unit through electromagnetic coupling between the motor/generator and the piston unit so as to produce electrical energy from movements of the piston unit and to use electrical energy to affect the movements of the piston unit, wherein the piston unit includes a rod that is attached to the piston or pistons and that interacts with a static part of the linear electric motor/generator through electromagnetic coupling between the rod and the static part of the electric motor/generator; and a control unit that controls the free piston engine and the linear electric motor/generator;

the energy converter being arranged to supply the control unit with information regarding required load, said energy converter also being arranged to adapt power output from said electric motor/generator depending on the required load of the energy converter.

17. A method for operating an energy converter, comprising:

providing an energy converter having
1) a free piston engine including a piston unit that comprises a) a piston or b) pistons that are connected together so as to reciprocate with each other; at least one combustion chamber provided with at least one inlet and at least one outlet and inlet and outlet valves, of which inlet and outlet valves at least one is controllable; and supply means for supplying fuel and a medium containing oxygen into the combustion chamber or chambers;
2) a linear electric motor/generator arranged to interact with the piston unit through electromagnetic coupling between the motor/generator and the piston unit so as to produce electrical energy from movements of the piston unit as well as to use electrical energy to affect the movements of the piston unit; and
3) a control unit that controls the free piston engine and the linear electric motor/generator,
wherein the piston unit includes a rod that is attached to the piston or pistons and that interacts with a static part of the linear electric motor/generator through electromagnetic coupling between the rod and the static part of the electric motor/generator;
supplying the control unit with information regarding the energy converter's required load; and
adapting power output from said linear electric motor/generator depending on the required load of the energy converter.

18. A method of starting an energy converter comprising:
providing an energy converter having
1) a free piston engine including a piston unit that comprises a) a piston or b) pistons that are connected together so as to reciprocate with each other; at least one combustion chamber provided with at least one inlet and at least one outlet and inlet and outlet valves, of which inlet and outlet valves at least one is controllable; and means for supplying fuel and a medium containing oxygen into the combustion chamber or chambers;
2) a linear electric motor/generator arranged to interact with the piston unit through electromagnetic coupling between the motor/generator and the piston unit so as to produce electrical energy from movements of the piston unit as well as to use electrical energy to affect the movements of the piston unit;
3) a control unit that controls the free piston engine and the linear electric motor/generator; and
4) a capacitor electrically connected to the linear electric motor/generator,
wherein the piston unit includes a rod that is attached to the piston or pistons and that interacts with a static part of the linear electric motor/generator through electromagnetic coupling between the rod and the static part of the electric motor/generator; and
storing in said capacitor electrical energy allowing said energy converter to provide power sufficient for it to be started within one stroke of the piston unit.

19. The energy converter as recited in claim 1, further comprising a capacitor that is electrically connected to the electric motor/generator and a battery that is configured and arranged to charge the capacitor when the free piston engine starts.

20. The method as recited in claim 10, wherein a capacitor is electrically connected to the electric starter/generator and a battery is configured and arranged to charge the capacitor, the method further comprising charging the capacitor by means of the battery when the free piston engine starts.

21. The method as recited in claim 15, wherein a battery is configured and arranged to charge the capacitor, the method further comprising charging the capacitor by means of the battery when the free piston engine starts.

22. The energy converter as recited in claim 16, further comprising a capacitor that is electrically connected to the electric motor/generator and a battery that is configured and arranged to charge the capacitor when the free piston engine starts.

23. The method as recited in claim 17, wherein a capacitor is electrically connected to the electric starter/generator and a battery is configured and arranged to charge the capacitor, the method further comprising charging the capacitor by means of the battery when the free piston engine starts.

24. The method as recited in claim 18, wherein a battery is configured and arranged to charge the capacitor, the method further comprising charging the capacitor by means of the battery when the free piston engine starts.

* * * * *

UNITED STATES PATENT AND TRADEMARK OFFICE
CERTIFICATE OF CORRECTION

PATENT NO. : 7,845,317 B2
APPLICATION NO. : 10/907026
DATED : December 7, 2010
INVENTOR(S) : Erland Max et al.

It is certified that error appears in the above-identified patent and that said Letters Patent is hereby corrected as shown below:

On the Title Page, item (73), "Assignee: Volvo Car Corporation, Gothenburg (SE)" should read as --Assignees: Volvo Car Corporation, Gothenburg (SE); Volvo Technology Corporation, Gothenburg (SE)--

Signed and Sealed this
Twentieth Day of August, 2013

Teresa Stanek Rea
*Acting Director of the United States Patent and Trademark Office*